May 30, 1933.   B. F. ANDRE   1,911,664
GRATE BAR
Original Filed Feb. 23, 1932    3 Sheets-Sheet 1
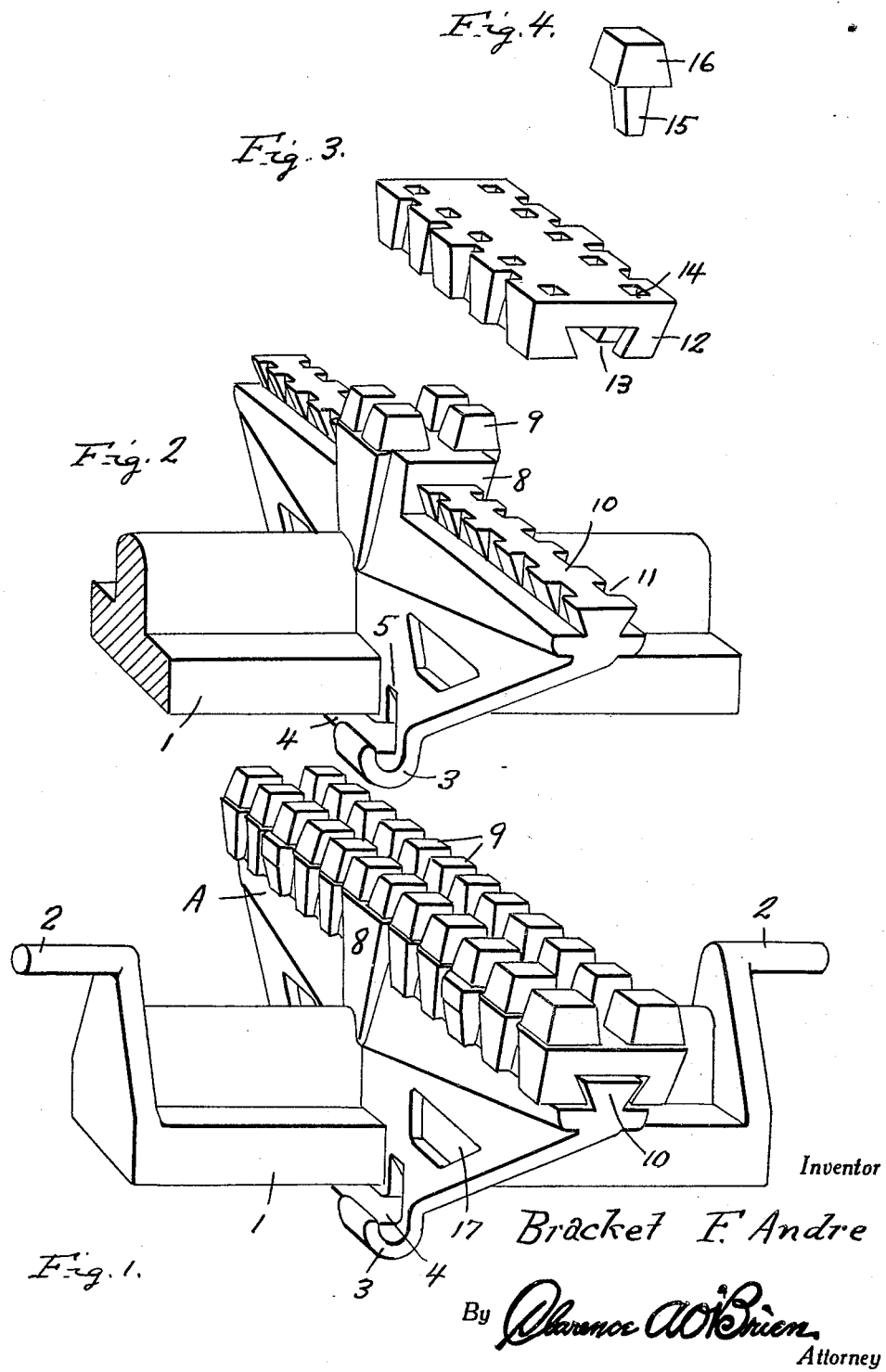

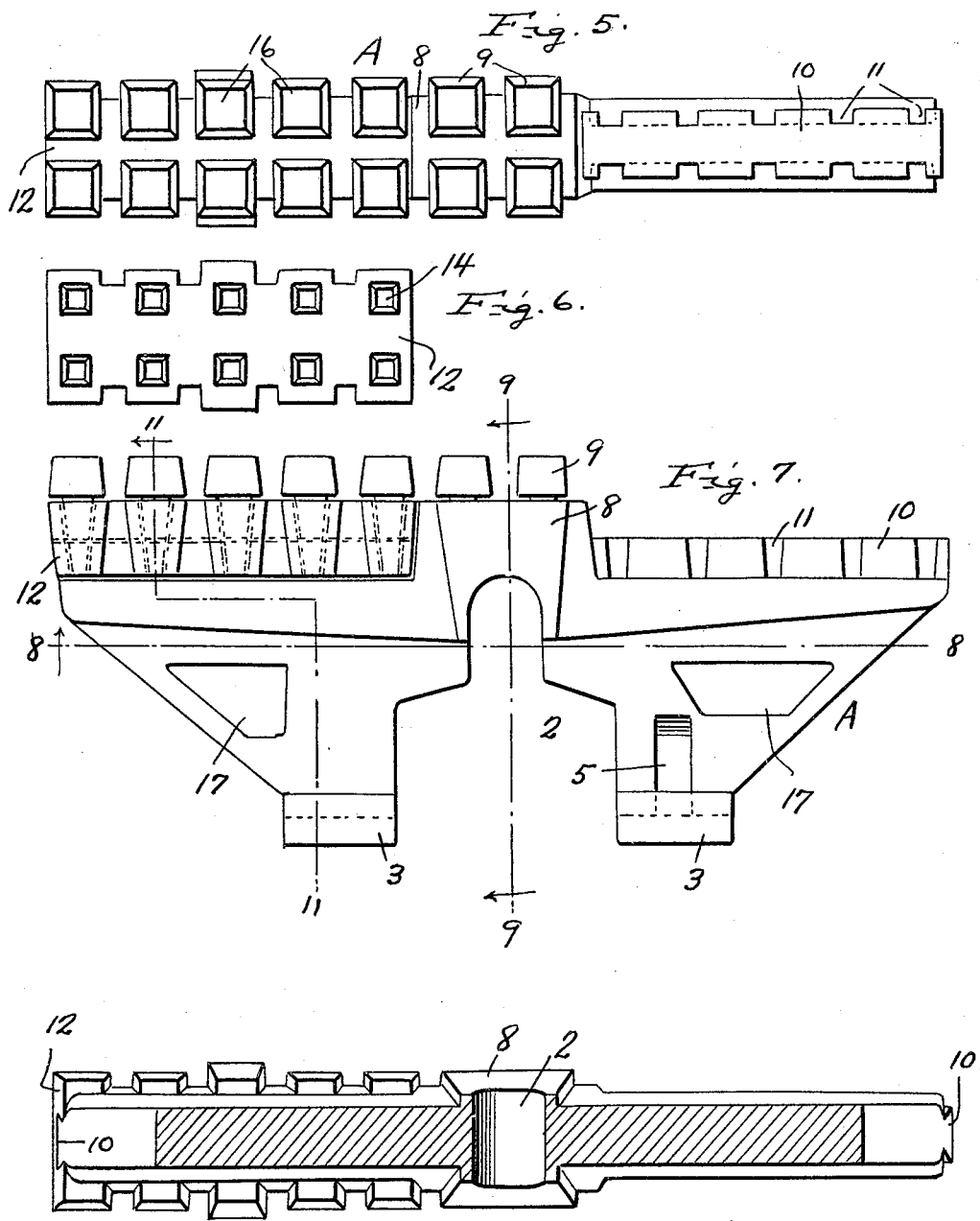

May 30, 1933.  B. F. ANDRE  1,911,664
GRATE BAR
Original Filed Feb. 23, 1932  3 Sheets-Sheet 3
Fig. 15.a
Fig. 16.
Fig. 9.
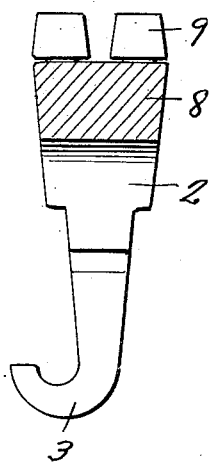
Fig. 10.
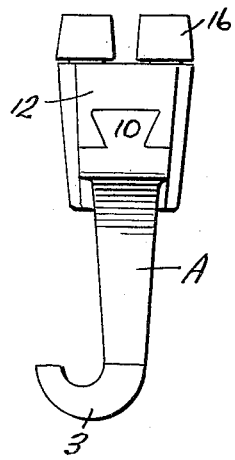
Fig. 11.
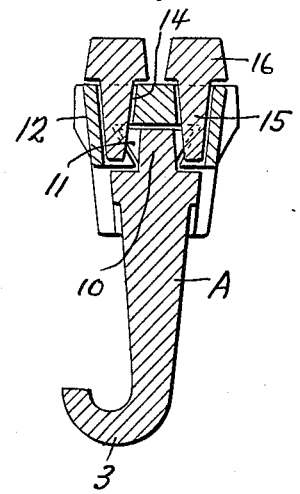
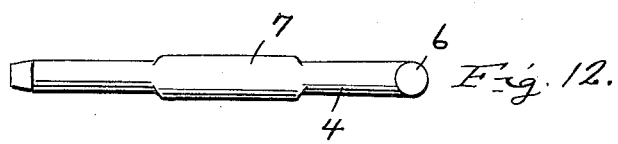
Fig. 12.
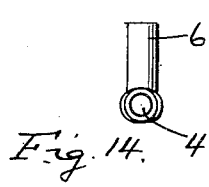
Fig. 14.
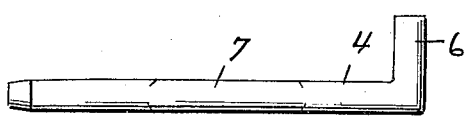
Fig. 13.
Inventor
Bracket F. Andre
By Clarence A. O'Brien
Attorney Patented May 30, 1933

1,911,664

UNITED STATES PATENT OFFICE

BRACKET FLORENCE ANDRE, OF ASHLAND, KENTUCKY

GRATE BAR

Application filed February 23, 1932, Serial No. 594,657. Renewed April 8, 1933.

This invention relates to a grate bar, the general object of the invention being to provide means for firmly locking the bar to its carrier or carriage, so that the bar is prevented from moving the carrier or carriage and to provide removable parts for the bar so that the parts most subjected to wear and damage can be easily renewed when necessary.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing one of the improved bars on its carrier or carriage.

Fig. 2 is a similar view but showing the removable parts removed from the bar.

Fig. 3 is a view of one of the removable parts with the pins or lugs removed therefrom.

Fig. 4 is a view of one of the removable pins or lugs.

Fig. 5 is a top plan view of the bar with one of the removable members removed therefrom.

Fig. 6 is a view in plan of said removable member with the pins and lugs removed therefrom.

Fig. 7 is an elevation of the bar shown in Fig. 5.

Fig. 8 is a section on line 8—8 of Fig. 7.

Fig. 9 is a section on line 9—9 of Fig. 7.

Fig. 10 is an end view.

Fig. 11 is a section on line 11—11 of Fig. 7.

Fig. 12 and Fig. 13 are two views of the locking pin.

Fig. 14 is an end view of said pin.

Fig. 15 is an elevation partly in section showing how the old type of grate bar is loosely supported from its carriage and this view shows in dotted lines, how the bar will get out of alinement.

Fig. 16 is a view similar to Fig. 15 but showing the improved bar and its locking means for locking the same in the carriage.

In these drawings, the numeral 1 indicates the carrier or carriage for the grate bars, this member 1 having the trunnion 2 at its end for swingingly supporting the member in a stove, furnace or the like. The letter A indicates a grate bar supported on the member 1 and, as shown in Fig. 15, these grate bars as now constructed, are formed with enlarged recesses $a$ for loosely receiving the member 1, so that the grate bar has play on the member 1 and thus there is a possibility of the grate bars getting caught and therefore thrown out of alinement as shown in dotted lines in Fig. 15, and if the bar remains in this crooked position any length of time, it will soon become very badly burned and must be removed and a new one substituted therefor.

As shown in Fig. 16, I make the recess of a size to snugly fit the member 1 and provide hooks 3 on the bottom edge of the bar, one on each side of the recess to receive a locking pin 4 which engages the bottom of the member 1 and thus firmly locks the grate bar to the member 1. One part of the lower portion of the grate bar is formed with a notch 5 to receive the bent end 6 of the pin to hold the pin in place and the central part of the pin is enlarged and flattened on its upper face as shown at 7 to firmly engage the bottom of the member 1.

I also form the central part of the upper portion of the improved grate bar with an enlargement 8 which extends above the other part of the bar and lugs or projections 9 are connected with the upper face of the enlargement as clearly shown in Fig. 2. The upper edge of the bar on each side of the enlargement is formed with a reduced part 10 which is of dove-tail shape and the sides of each part 10 are formed with notches 11 which have their inner walls sloping downwardly and outwardly as shown.

An elongated block-like member 12 is removably supported on the grate bar at each side of the enlargement 8 by having a dovetailed shaped recess 13 therein for receiving the reduced part 10, this member being provided with the openings 14 vertically arranged and passing through the top thereof, these openings being in alinement with the notches 11 and are adapted to receive the truncated pyramidal shanks 15 of the studs 16. Thus when the shanks 15 are passed through the openings 14, they will engage the notches 11 and thus lock each member 12 with the reduced part 10 as shown in Fig. 11.

Thus, when any of the studs 16 become damaged, they can be readily removed and replaced by new ones, and if either one of the members 12 should become damaged, by removing all the studs therefrom this member can be removed and replaced by a new one, and either the old studs put back in place or new ones substituted for the old ones.

The lower portion of the grate bar is formed with the openings 17 to lighten the same.

From the foregoing it will be seen that I have provided simple means for locking a grate bar to its carrier and means for easily and quickly enabling damaged parts of the bar to be removed and replaced by new ones.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. In combination with a grate bar and its carrier, means for locking the grate bar to the carrier, to prevent relative movement of the bar with the carrier, said bar having an enlarged central part extending above the upper edges of the side portions of the bar, said upper edges of said side portions being reduced to form a rib having undercut sides, a member removably engaging each rib and having an undercut groove in its lower part for receiving the rib, the sides of said ribs having notches therein, and said member having openings therein registering with the notches, and headed studs passing thru the openings into the notches for locking the members to the ribs.

2. In a grate structure, a grate bar having a longitudinally extending dove-tail shaped rib thereon having spaced notches in its sides, an elongated member having a dove-tailed shaped groove in its under face for receiving said rib, said member having openings therein registering with the notches and headed studs having their shanks passing through the openings into the notches for locking the member to the rib.

In testimony whereof I affix my signature.

BRACKET FLORENCE ANDRE.